United States Patent
Dabholkar (10) Patent No.: US 10,976,172 B2
(45) Date of Patent: Apr. 13, 2021

(54) RECOMMENDING DESTINATIONS OF MAP-RELATED REQUESTS USING CATEGORIZATION

(71) Applicant: Uber Technologies, Inc., San Francisco, CA (US)

(72) Inventor: Juthika Dabholkar, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 675 days.

(21) Appl. No.: 15/425,489

(22) Filed: Feb. 6, 2017

(65) Prior Publication Data

US 2018/0188058 A1 Jul. 5, 2018

Related U.S. Application Data (60) Provisional application No. 62/441,162, filed on Dec. 31, 2016.

(51) Int. Cl.
  *G01C 21/36* (2006.01)
  *G01C 21/34* (2006.01)
  *G01S 19/13* (2010.01)

(52) U.S. Cl.
  CPC ..... *G01C 21/3617* (2013.01); *G01C 21/3476* (2013.01); *G01C 21/3679* (2013.01); *G01S 19/13* (2013.01)

(58) Field of Classification Search
  None
  See application file for complete search history.

(56) References Cited

U.S. PATENT DOCUMENTS

| | | | |
|---|---|---|---|
| 8,589,330 B2 | 11/2013 | Petersen et al. | |
| 8,700,320 B1 | 4/2014 | Teicher | |
| 9,400,186 B1* | 7/2016 | Bank | G01C 21/3484 |
| 2010/0168996 A1* | 7/2010 | Bourque | G01C 21/3611 |
| | | | 701/532 |
| 2010/0205060 A1* | 8/2010 | Athsani | G01C 21/3484 |
| | | | 705/14.58 |

(Continued)

FOREIGN PATENT DOCUMENTS

| JP | 2014-115906 A | 6/2014 |
|---|---|---|
| JP | 2014-157093 A | 8/2014 |

OTHER PUBLICATIONS

PCT International Search Report and Written Opinion, PCT Application No. PCT/IB2017/056962, dated Feb. 26, 2018, 13 pages.

*Primary Examiner* — Navid Ziaeianmehdizadeh
(74) *Attorney, Agent, or Firm* — Fenwick & West LLP (57) ABSTRACT

A system anticipates one or more destinations that a user may be interested in requesting. Using parameters such as time of day, day of week, and user device location, the system categorizes users according to current user parameters. Categories, which may be predefined by the system, are organized according to similar destination types. In some embodiments, the system determines variety scores indicative of whether a user is likely to select a destination that the user has requested before or more likely to select a new destination, within a selected category. The system uses the determined categories and variety scores to select a list of destinations to suggest to the user.

20 Claims, 5 Drawing Sheets

(56) References Cited

U.S. PATENT DOCUMENTS

| | | | |
|---|---|---|---|
| 2012/0271541 A1* | 10/2012 | Hjelm | G01C 21/3484 |
| | | | 701/410 |
| 2013/0066548 A1* | 3/2013 | Gruen | G01C 21/3617 |
| | | | 701/410 |
| 2015/0168150 A1 | 6/2015 | Kahn et al. | |
| 2015/0345970 A1 | 12/2015 | Tanaka et al. | |
| 2016/0104113 A1* | 4/2016 | Gorlin | G06Q 10/08355 |
| | | | 705/338 |
| 2016/0195403 A1* | 7/2016 | Tuukkanen | G01C 21/3423 |
| | | | 701/533 |
| 2016/0195405 A1 | 7/2016 | Kreifeldt | |

* cited by examiner

RECOMMENDING DESTINATIONS OF MAP-RELATED REQUESTS USING CATEGORIZATION

CROSS-REFERENCE TO RELATED APPLICATIONS

This application claims the benefit of U.S. Provisional Application No. 62/441,162, titled "Recommending Destinations of Map-Related Requests Using Categorization" and filed Dec. 31, 2016, which is incorporated by reference in its entirety.

BACKGROUND

Field of Art

This disclosure relates generally to destination selection, and in particular to anticipating user destinations based on past trips taken by a user.

Description of Art

Computerized systems provide a means of determining routes to destination addresses. The computerized systems can find user-specified addresses on a map, and/or provide routes between multiple addresses. Mapping and routing can have various applications, such as helping groups of people coordinate travel and directing drivers of vehicles to locations the drivers may be unfamiliar with.

A user enters the address of a trip destination each time the user requests a trip from a system that provides travel services, or each time the user wants to find a location on a map. This can become tedious, especially as a user may tend to frequently input certain locations, and thus is required to input the same addresses again and again. Currently, some systems allow a user to save a "home" location and a "work" location or other designated "favorites" or saved destinations. These static locations tend to be presented to the user without considering the user's typical behaviors or anticipating the likely destination of a user when the user makes a particular trip request. In addition, users travelling to locations other than one of the saved destinations, and users who are not in a familiar region still must enter an address manually.

SUMMARY

A system anticipates potential destinations and suggests the potential destinations to users. By suggesting destination addresses that a user is likely to be interested in, the system helps users discover new locations and prevents unnecessary and tedious address entry steps. The system selects a set of destinations to suggest to a user based on current parameters, past trips taken by the user, and/or past trips taken by other users.

The system may select destinations and provide services related to a selected destination. As an example, the destination search system may also provide routing and direction information to a user (e.g., a service provider) for the user to navigate to the selected destination. In addition, the destination search system may be a part of a system that coordinates travel for a user, for example to identify a provider to convey the user to the selected destination.

The system uses parameters based on a current context of a user to categorize the user into one or more categories. Each category reflects possible types of locations that the user may select as a destination. Example categories include, but are not limited to, commuter, tourist, food enthusiast (also referred to as "foodie" herein), and/or party-goer. For instance, a commuter may be a user who has exhibited a pattern of travel between a home location and a work location. A foodie may be a user who exhibited a pattern of requests related to traveling to or from, or requesting food from, a restaurant. A party-goer may be a user who exhibited a pattern of travelling to or from bars and clubs. A tourist may be someone who is not located within a home region, where a "home region" may be defined as an area within a radius of a predetermined distance from the user's home location. A tourist categorization can additionally include the number of times that the user has been near the location (e.g., a tourist includes someone who has visited a city less than a predetermined number of times).

As stated, parameters can be used to categorize a user within a particular context. The user context may include parameters like the time at which a user opens a system application on a user device, a corresponding day of the week, and whether the user is within a threshold distance of the user's home location. Past trips taken by the user may also contribute to a category determination. For example, if a user's historical selections for a destination are "home" from work on a Tuesday between 6:00 and 6:30 PM, the system may categorize the user as a commuter when selecting a category for the user on Tuesdays in the same timeframe.

To determine a likely user category for a current trip, parameters of the current trip are used to determine the categories of prior trips taken having the same or a similar context. Thus, each prior trip may be considered to represent a user traveling with a given user category. For example, a "foodie" category represents a user traveling to destinations having categories associated with dining or food, restaurants, bars, or diners; and the "commuter" category represents a user traveling to a repeat destination while having the same parameters. One or more user categories is assigned based on a portion of trips for the current parameters corresponding to user categories.

In some embodiments the system determines a variety score for a user for one or more of the categories associated with the current request. For some categories, a variety score may be generated, while other categories may not use a variety score. A variety score represents a user's tendency to request destinations that the user has never requested before with respect to a category. For example, a user categorized as a foodie may have a high variety score if the user tends to eat dinner at restaurants the user has never been to before. Conversely, a user categorized as a foodie may have a low variety score if the user tends to eat dinner at a particular restaurant or set of restaurants the user has been to before.

Using the user categorizations and any associated variety scores, the system selects a set of possible destinations to suggest to a user. The destinations may be selected from a combination of past trips taken by the user and past trips taken by other users. The selected categories determine the types of destinations that are suggested. For example, users categorized as "foodies" will be suggested locations that have a location type corresponding to the foodie category (e.g., restaurants and diners), and a user categorized as a "commuter" is suggested the destination frequently selected by the user when the user has these parameters (or a "home" location). In one embodiment, variety scores determine a portion of destinations chosen from a user's own past trips and a portion of destinations chosen from other users' past trips. A high variety score for a particular category can indicate that a user likes trying new destinations related to that category (e.g., new restaurants), so the user may receive suggestions for destinations that others have been to, but that the user has never requested before. Such suggested destinations may be based on destinations of other users who are similarly categorized and/or have some past locations in common with the user. In one embodiment, the system transmits one or more of the selected destinations to a user device that may convey the destination suggestions to the user.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

Figure (FIG. 1 is a high-level block diagram of a system environment, in accordance with an embodiment.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
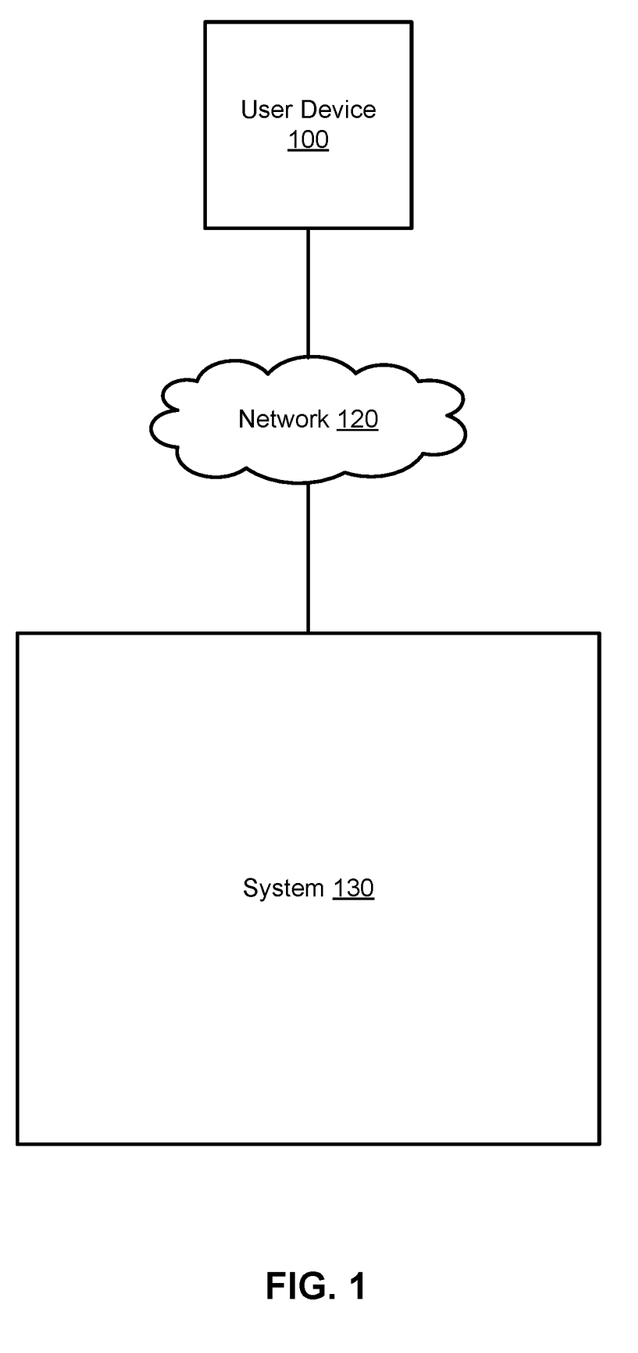

Figure (FIG. 1 is a high-level block diagram of a system environment for a system 130, in accordance with some embodiments. FIG. 1 includes a user device 100, a network 120, and the system 130. For clarity, only one user device 100 is shown in FIG. 1. Alternate embodiments of the system environment can have any number of user devices 100 as well as multiple systems 130. The functions performed by the various entities of FIG. 1 may vary in different embodiments. The system 130 may provide routing and direction information to a user operating the user device 100. In some embodiments, the system 130 may coordinate travel for a user, for example, by matching the user with a provider who can transport the user, items, or services to a destination requested by the user.

The system 130 can anticipate trips a user may want to take, for example, based on the user's past trips and/or based on past trips of other users. For instance, the system 130 categorizes a user according to current and/or predicted parameters, such as time of day, day of week, trip origin location (e.g., pickup location), and trip destination (e.g., drop-off location). In some embodiments, categories and logical rules for making particular categorizations based on parameters are preprogrammed into the system 130. Some example categories include commuter, foodie, party-goer, and tourist. In some embodiments, categories are based on a tendency for users within a category to go to the same types of locations. For example, commuters tend to frequently travel between home and another location, such as work. The system 130 selects one or more destinations from a set of past trips taken by the user and/or past trips taken by other users with the same categorization and suggests the destinations to the user.

A user may enter location information and/or request transportation from the system 130 through a user device 100. User devices 100 can be personal or mobile computing devices, such as smartphones, tablets, or notebook computers. In some embodiments, the user device 100 executes a client application that uses an application programming interface (API) to communicate with the system 130 through the network 120.

In some embodiments, a user can make a trip request to the system 130 through operation of the user device 100. For example, a trip request may include one or more of a user identification information, a number of passengers for the trip, a requested type of the provider (e.g., a vehicle type or service option identifier), the current location and/or the pickup location (e.g., a user-specific location, or a current location of the user device 100), and a trip destination. The current location of the user device 100 may be designated by the user, or detected using a location sensor of the user device 100 (e.g., a global positioning system (GPS) receiver).

User devices 100 may interact with the system 130 through client applications configured to interact with the system 130. The client applications of the user devices 100 can present information received from the system 130 on a user interface, such as a map of the geographic region, and the current location of the user device 100. The client application running on the user device 100 may be able to determine the current location and provide the current location to the system 130.

The user devices 100 can communicate with the system 130 via the network 120, which may comprise any combination of local area and wide area networks employing wired or wireless communication links. In some embodiments, all or some of the communication on the network 120 may be encrypted.

The system 130 can store maps of geographic regions in which the system 130 services users, and may provide information about these maps to users and/or providers through the user devices 100. For example, the system 130 may provide routing directions to a provider to pick up the user and transport the user to a destination.

Figure 2:
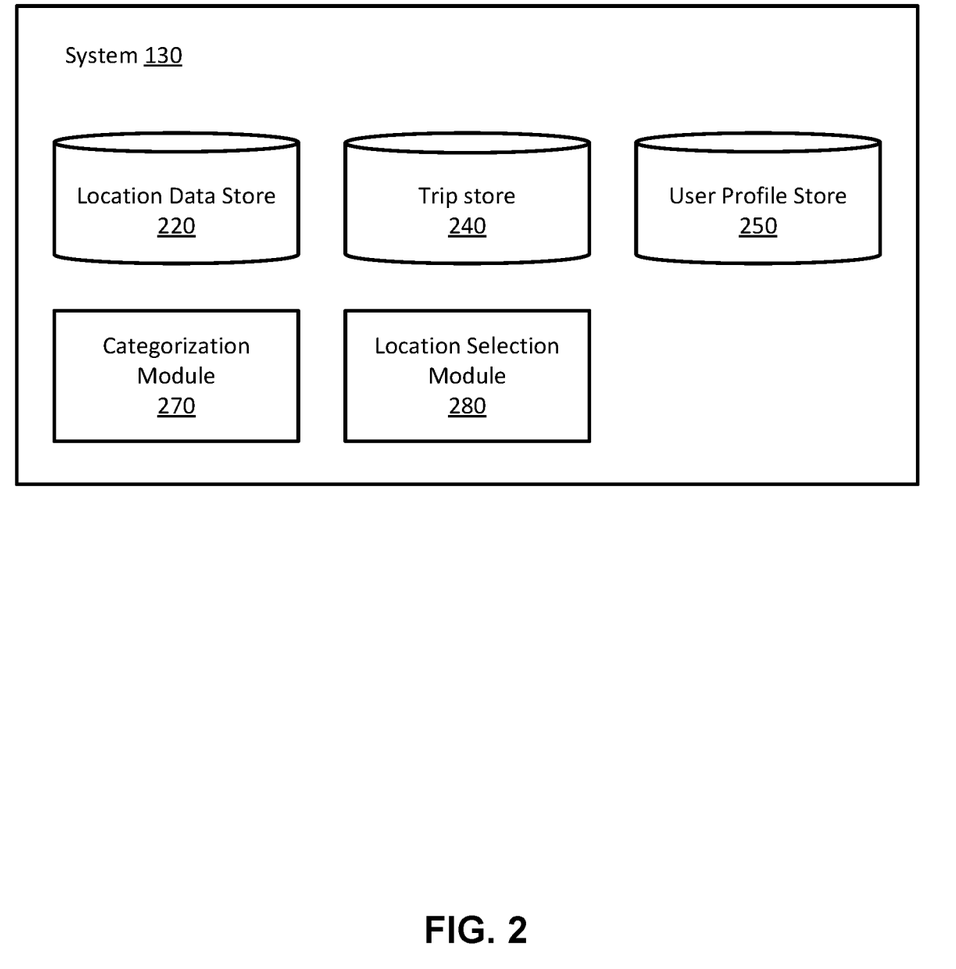
FIG. 2 is a high-level block diagram of a system architecture, in accordance with an embodiment.

FIG. 2 is a high-level block diagram of a system architecture for the system 130, in accordance with some embodiments. The system includes various modules and data stores to monitor trips and/or anticipate destinations. The system 130 comprises a location data store 220, a trip store 240, a user profile store 250, a categorization module 270, and a location selection module 280. Computer components such as web servers, network interfaces, security functions, load balancers, failover servers, management and network operations consoles, and the like are not shown so as to not obscure the details of the system architecture. Additionally, the system 130 may contain more, fewer, or different components than those shown in FIG. 2 and the functionality of the components as described herein may be distributed differently from the description herein.

The location data store 220 stores information about locations that are relevant to the system 130. Locations can include places that users of the system 130 can specify as destinations when submitting a trip request. Some examples of location information that may be kept in the location data store 220 include the addresses of restaurants, addresses of museums, and practical pick-up and drop-off positions near popular attractions. The location data store 220 may also store location information about regions. For example, the location data store may store geographic data and/or information about political boundaries.

The trip store 240 stores data related to some or all past trips facilitated by the system 130. In some embodiments, trip data may be collected by the location selection module 280, which selects destinations to suggest to a user and may monitor trip progressions, for example, whether a trip ends at the originally selected location. Trip data may include information about one or more of an origin and a destination of a trip, a time of the trip, and an identification of the user who requested the trip. Stored trip information can also include a user categorization associated with a trip (e.g., whether a user was acting as a commuter or a party-goer when taking the trip).

In some embodiments, the data in the trip store 240 is represented as a sparse graph. Nodes of the graph represent locations that may be origins or destinations (e.g., locations stored in the location data store 220) of past trips taken by users of the system 130. An edge connecting two nodes in the graph represents a trip taken between the two nodes (e.g., locations). In one embodiment, information related to a trip (e.g., direction, time of day, user identification, user categorization, etc.) is stored in an edge of the graph that represents that trip.

The user profile store 250 stores data about individual users. For example, the user profile store may store information about a user's home location and a user's work location. In some embodiments, a user explicitly enters addresses for a home location and a work location. In other embodiments, the system 130 may infer a user's home and work locations, for example, associating a location a user has returned to at night for the last twenty days with the user's home address. In some embodiments, the user profile store 250 stores information about each user's past trips. For example, a user profile may include references to trips stored in the trip store 240, that were taken by the user.

The categorization module 270 selects one or more categories that apply to a user according to current parameters (e.g., time of day, user location, etc.). As stated above, example categories include commuter, foodie, party-goer, and tourist.

The categorization module 270 may use predefined rules to designate categories for trips and likely categorizations for a user. In some embodiments, the categorization module 270 collects data from the user profile store 250 and/or from the trip store 240 that indicates the number of times a user has taken a trip associated with each category within the selected timeframe (e.g., day of week and time of day). Although it is appreciated that the collected data need not be represented graphically, for the purposes of explanation the collected data may be in a form such that it could be represented in a histogram or as a pie chart of all the past trips taken in the timeframe by the user, the histogram or pie chart being organized by category. In some embodiments, user categorization is based on data collected according to timeframe and origin location (e.g., current location of a user device 100). The categorization module 270 may select the category that most frequently applies to a user within a timeframe. In some embodiments, the categorization module 270 selects some ratio or combination of multiple categories that apply to the user within the timeframe.

The categorization module 270 determines variety scores for a user for one or more of the selected categories. A variety score is a value (e.g., a percent likelihood) that is representative of whether the user tends to select repeat trip destinations or new trip destinations. A variety score could be based on a percentage of all past trips of the same category taken by the user that had destinations the user had never taken a trip to before. Variety scores are used to determine whether trip suggestions should come from the user's past trips, from other users' past trips, or from a combination of the two. For example, a user who, when categorized as a foodie, goes to one favorite restaurant 30% of the time, but tries new restaurants 70% of the time, can have a foodie variety score of 70%.

The location selection module 280 uses determined categories and, when applicable, uses associated variety scores to select one or more destinations to suggest to the user. In some embodiments, the location selection module 280 also stores information about location selections and trip categorizations in the trip store 240, and monitors trips, for example to determine whether a destination changes during a trip. The location selection module 280 uses predefined rules to filter a set of destinations to suggest to the user based on past trips taken by the user and/or past trips taken by other users. In some embodiments, the location selection module 280 may filter a set of locations based on past locations searched and/or entered into the system by the user, regardless of whether the user subsequently travelled to the location. For some categories, the filtering rules may indicate how much of the user's own past trips should be considered over other users' trips. For example, filtering rules may include a rule that only a user's own past destinations should be considered when a user is categorized as a commuter since commuters travel between their own specific destinations frequently (such as home and work destinations). As another example, a user who is categorized as a tourist may have a high variety score (e.g., when the user has been a tourist in the past, the user has mostly requested destinations the user has never requested before). For such a user, the location selection module 280 selects trips with the same destinations as other tourists in the region have requested in the past.

In some embodiments, the location selection module 280 transmits the selected destinations to a user device 100, where one or more of the selected destinations may be suggested to the user. For example, upon opening an application to access the system 130 information, the user may be presented with a list of the suggested destinations. In some embodiments, such suggestions may be accompanied by explanations (e.g., "You often go home on weekdays at 6:00. Would you like a ride home now?") or a user-selectable graphical user interface component to initiate the suggested service (e.g., a notification with a request-ride button). In some embodiments, a user may have an option to select a specific categorization. For example, if a user indicates a desire to visit tourist sites in the user's home town, the system 130 could categorize the user as a tourist and suggest tourist destinations for a user within the user's home region.

In some embodiments, the location selection module 280 may help to characterize locations. The location selection module 280 may monitor trips taken by categorized users. In some embodiments, the location selection module 280 contributes information about the categories of users who visit certain locations to the location data store 220. The system 130 may use user category data to determine characteristics about a location and whether the location belongs to a particular category. For example, if users are considered party-goers when selecting a particular location, the system may infer that the location corresponds to a category consistent with a party-goer destination, such as a bar or a club at the location. In this way, example embodiments can facilitate automatic map creation and map refresh as new businesses arise.

Figure 3:
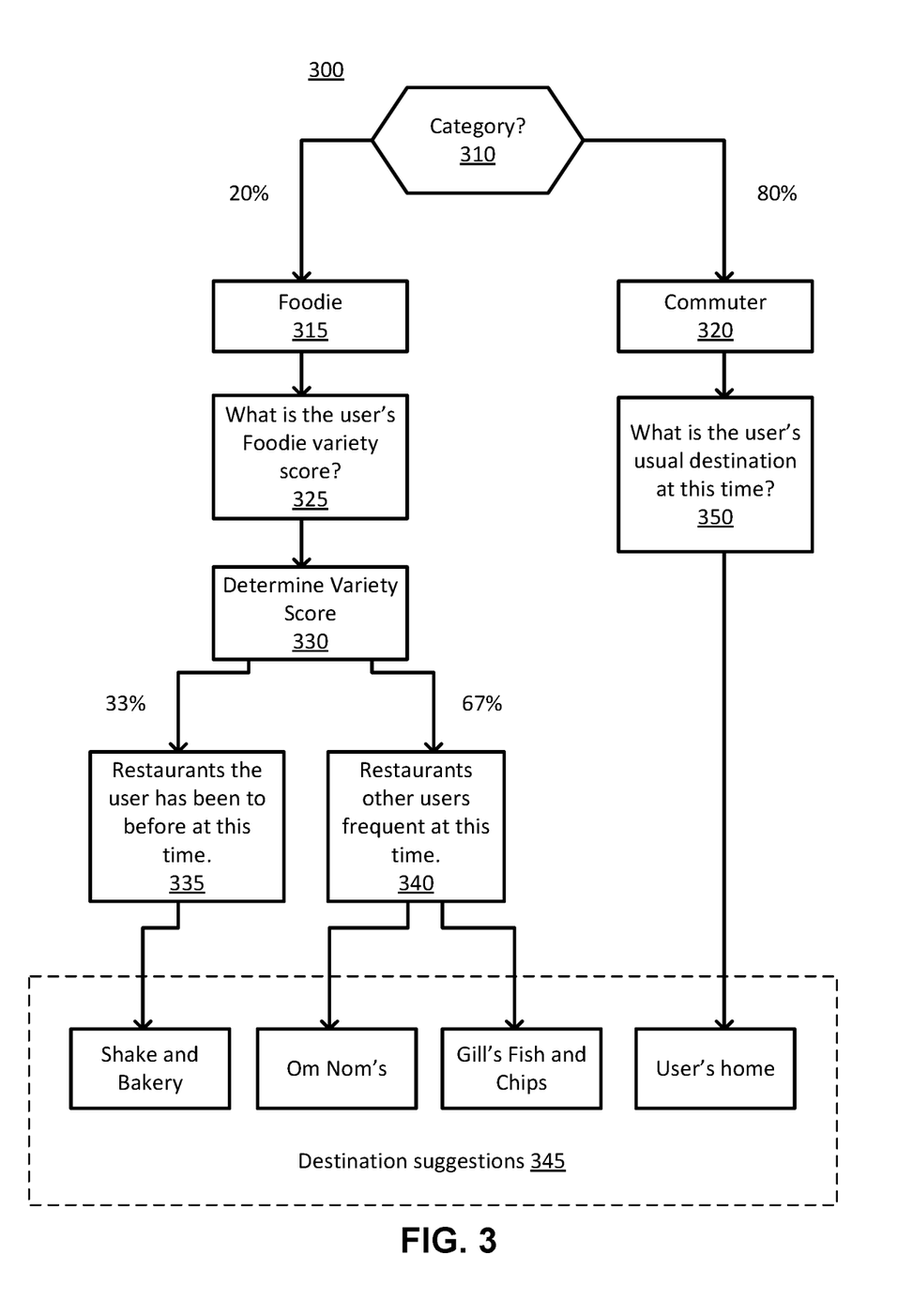
FIG. 3 is a data flow diagram demonstrating an example process for selecting destinations for a user, in accordance with an embodiment.

FIG. 3 is a data flow diagram 300 demonstrating an example process for selecting destinations for a user, in accordance with an embodiment. In the example of FIG. 3, a user has been categorized 310 as being 20% foodie 315 and 80% commuter 320 within the current timeframe. The user may have opened the system 130 application on a user device 100 at a time when the user usually goes home from work and sometimes requests a ride directly to a restaurant after work.

Since the categorization module 270 determined 310 that the user is 20% percent foodie, the location selection module 280 determines a variety score 330 that is associated with the user when the user is being a foodie (e.g., how often the user goes to a restaurant the user has never been to before relative to how often the user visits restaurants the user has previously visited). The variety score may be determined by analyzing the trip edges between locations and determining whether a user has more than one trip edge to that destination. In the case shown in FIG. 3, the user goes to new restaurants 67% of the time when the user is categorized as a foodie. As a result, the location selection module 280 may select a combination of restaurants the user has been to before 335 and restaurants the user has never been to before 340 as destinations (e.g., with a ratio of 1:3). The selected destinations are added to a set of possible destinations to suggest to the user 345.

Since the categorization module 270 determined 310 that the user is a commuter 320 80% of the time the user requests a ride in the current time frame, the location selection module 280 selects 350 a commuter destination. A commuter may be understood to be a frequent traveler, in that, within a timeframe, a user who is categorized as a commuter frequently goes to the same location. As such, being categorized as a "commuter" may not restrict a user's destinations to work and/or home locations. As commuter destinations are particular to individual users, the location selection module 280 may be programmed to suggest a route and/or destination that the user normally takes during this timeframe (e.g., the user's home address). In the example of FIG. 3, the location selection module 280 determines that the user's usual commuting destination is the user's home, and thus selects the user's home address as a possible destination to suggest to the user (e.g., to add to the set of destination suggestions 345).

Figure 4:
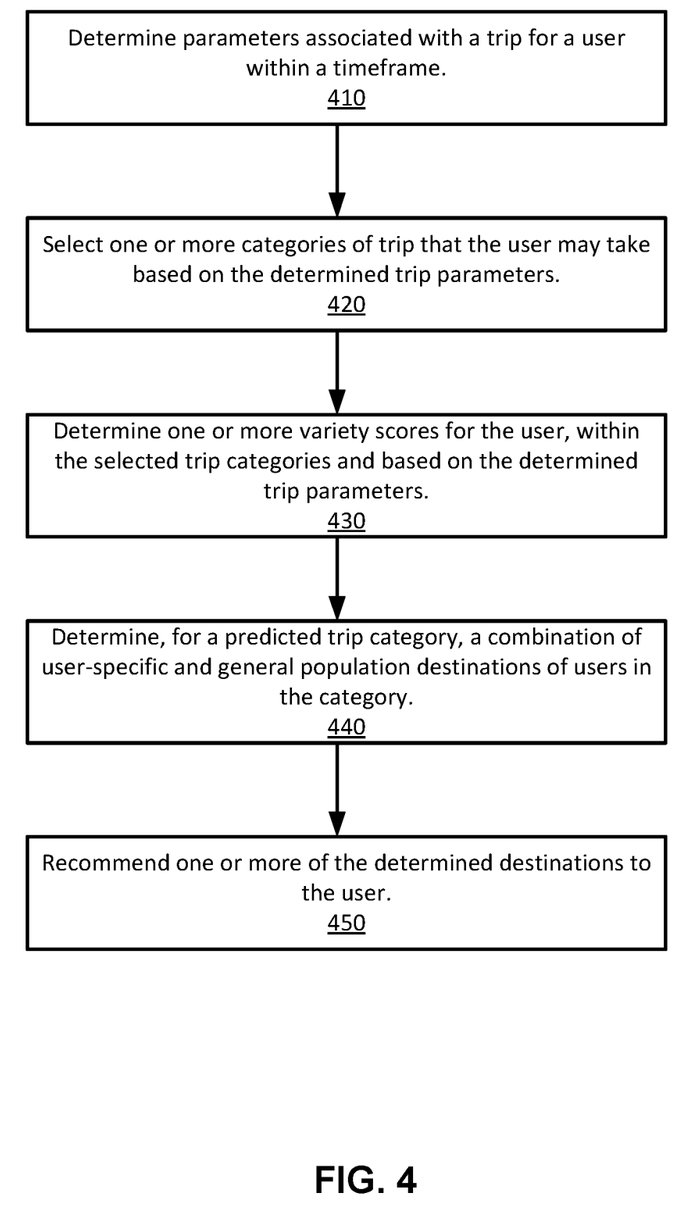
FIG. 4 is a flowchart that describes a process for anticipating user destinations, in accordance with an embodiment.

FIG. 4 is a flowchart that describes a process for anticipating user destinations, in accordance with an embodiment. The system 130 determines 410 parameters associated with a trip. Such parameters may include a time the trip may be requested, a user device 100 location, and whether the user is near home (e.g., in a home region). In some embodiments, parameters may be obtained from the user device 100 (e.g., via a GPS receiver, a system clock, etc.), from information sent to the system 130 over the network 120, and/or from information entered at the user device 100 by a user.

Using the determined parameters, the categorization module 270 selects 420 one or more categories that may apply to the user. For example, the categorization module 270 determines, based on past trips taken by the user whether the user is likely to act like a commuter, a foodie, a party-goer, a tourist, or otherwise. Categorization depends on context, as defined by the determined parameters. For example, a user can be categorized differently at different times of a day. In some embodiments, categorization can be accomplished with rule engines using predetermined rules and/or using machine models that have been trained to categorize users.

The categorization module 270 determines 430 one or more variety scores for the user, the variety scores being based on the frequency at which the user requests destinations that the user has never requested before. A variety score may be determined for each category individually. For example, within a certain timeframe, a user can tend to go to either the same pizza restaurant, or a new nightclub. So, the user would have a low foodie variety score within this timeframe, but would have a high party-goer variety score.

The location selection module 280 determines 440 a combination of user-specific and general population destinations for one or more of the selected categories. A combination can include one or more of each of user-specific destinations and general population destinations, only user-specific destinations, or only general population destinations. Destination determinations made by the location selection module 280 may be based on predefined rules. In some embodiments, each category has a set of rules that describe how various trip parameters and variety scores should be considered when selecting destinations. In some embodiments, computer models trained using machine learning techniques (e.g., decision trees, support vector machines, Bayesian networks, etc.) may be used in addition or in place of a rule engine that selects one or more categories based on predefined rules. In such cases, a machine learned model may be trained to use characteristics of past user trips and characteristics of locations to predict one or more destinations the user may be interested in within the current timeframe, given the user categorization.

The system 130 recommends 450 one or more of the determined destinations to the user, for example, by sending the determined destinations to a user device 100 for presentation to the user. A user device may present the determined destinations to the user in a variety of ways. In one embodiment, the user device may suggest destinations to the user in response to the user opening an application that communicates with the system 130. Recommendations may be provided for location searches (e.g., in connection with destination selection). For example, in response to detection of user selection of a search text bar for destination selection, the system can present a number of the destination recommendations as possible search results and/or search terms (e.g., destination recommendations related to text input by the user in the search bar). As the system receives user input corresponding to successive letters of the search terms, the system 130 can update the recommended destinations according to the current search string.

Additionally or alternatively, recommendations can be presented as graphical interface components that are user selectable. For instance, the home screen of the application on the user device can provide an area for presenting a number of graphical buttons, each representing a destination. The system 130 can provide destinations associated with one or more of the buttons. In response to receiving input indicative of user selection of a button, the application can initiate a trip request for the corresponding destination.

In some embodiments, the user device may proactively present destination suggestions to a user without the user opening an application or otherwise indicating an intent to request a trip, such as with a notification. For example, the system 130 may predict that a user will act like a commuter between 6:30 and 7:30, and will accordingly suggest a commuter destination to the user or request to know whether the user will take a trip at that time. In some embodiments, the system 130 may receive an indication from a user that the user plans to travel to destinations of a specific category at a specified future time. In such cases, the system 130 may proactively present destination suggestions for the specified category and specified future time to the user. By predicting the trip and receiving a user confirmation of the trip, for which the system provides services, the system may prearrange or reserve resources for servicing the trip, and by doing so for many users may identify upcoming trends in resource allocation for upcoming trips at the user's confirmed time and to a selected location.

Figure 5:
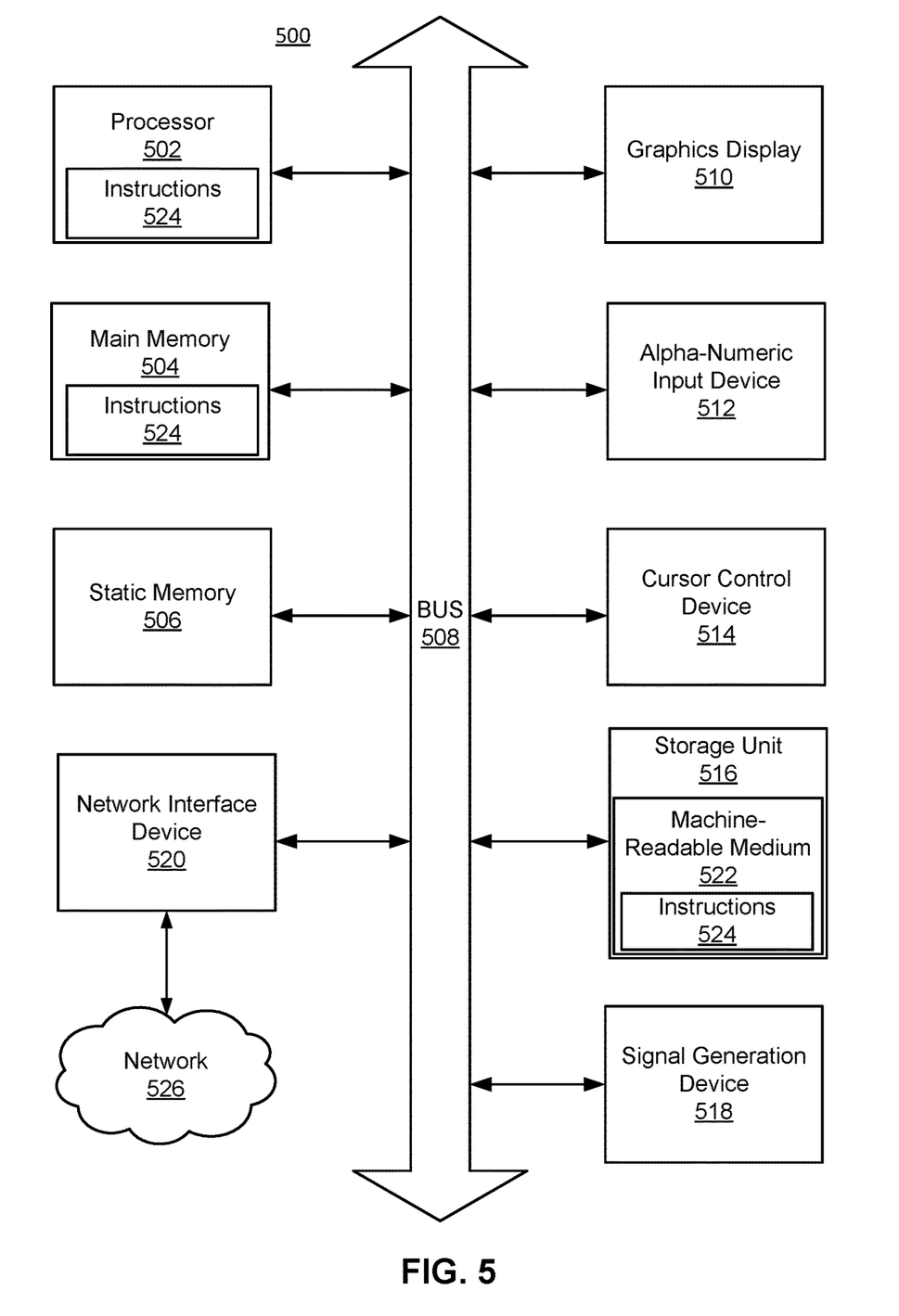
FIG. 5 is a high-level block diagram illustrating physical components of a computer, in accordance with an embodiment.

FIG. 5 is a block diagram illustrating components of an example machine able to read instructions from a machine-readable medium and execute them in one or more processors (or controllers). Specifically, FIG. 5 shows a diagrammatic representation of system 130 in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504, and the storage unit 516 communicate via a bus 508.

In addition, the computer system 506 can include a static memory 506, a graphics display 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. For example, the instructions 524 may include instructions for implementing the functionalities of the categorization module 270 and the location selection module 280. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by one or more computer processors for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
    determining a set of parameters associated with a user of a user device, the parameters including a timeframe for a trip;
    selecting a set of trip categories, based on prior destinations of the user at a similar timeframe and further based on the determined parameters;
    for each of the selected trip categories:
        determining a variety score associated with the selected trip category for the user based on the determined parameters and based on information about past behavior of the user; and
        generating a set of destinations to recommend to the user for the selected trip category including user-specific destinations the user has visited and general population destinations the user has not visited but that other users have visited, wherein the variety score is used to determine a portion of the set that are user-specific destinations and a portion of the set that are general population destinations; and
    transmitting one or more destinations from each of the generated sets of destinations associated with the selected trip categories to the user device for presentation to the user wherein the presentation includes user-selectable graphical interface components, each component representative of a destination.

2. The computer-implemented method of claim 1, wherein the parameters include one or more of a time of day, a day of week, and a location of a user device of the user.

3. The computer-implemented method of claim 1, wherein selecting a set of trip categories based on the determined parameters comprises:
    determining, for each category, a frequency of the category at the timeframe by determining a percentage of times that the user requested a trip to a destination associated with the category within the timeframe; and
    selecting the one or more trip categories based on the frequency of the most frequently used category.

4. The computer-implemented method of claim 1, wherein one or more of the generated destinations are selected from destinations of each selected trip category based on the frequency of the trip category at the timeframe.

5. The computer-implemented method of claim 1, wherein the variety score for a user within a selected trip category is based on a ratio of the number of times that the user has requested a destination the user has never requested before within the selected trip category and within the current timeframe to the number of times the user has requested any destination within the selected category and within the current timeframe.

6. The computer-implemented method of claim 1, wherein the general population destinations of users within a category include destinations of past trips that are associated with the same category as the current user, and that were requested by users other than the current user.

7. The computer-implemented method of claim 1, wherein recommending one or more of the determined destinations to the user comprises:
    transmitting one or more of the determined destinations to a user device; and
    presenting one or more of the transmitted destinations to the user such that the user may select a destination without entering an address, the presentation occurring without the user interacting with an application on the user device.

8. A non-transitory computer-readable storage medium storing computer program instructions executable by one or more processors of a system to perform steps comprising:
    determining a set of parameters associated with a user of a user device, the parameters including a timeframe for a trip;
    selecting a set of trip categories, based on prior destinations of the user at a similar timeframe and further based on the determined parameters;
    for each of the selected trip categories:
        determining a variety score associated with the selected trip category for the user based on the determined parameters and based on information about past behavior of the user; and
    generating a set of destinations to recommend to the user for the selected trip category including user-specific destinations the user has visited and general population destinations the user has not visited but that other users have visited, wherein the variety score is used to determine a portion of the set that are user-specific destinations and a portion of the set that are general population destinations; and
    transmitting one or more destinations from each of the generated sets of destinations associated with the selected trip categories to the user device for presentation to the user wherein the presentation includes user-selectable graphical interface components, each component representative of a destination.

9. The non-transitory computer-readable storage medium of claim 8, wherein the parameters include one or more of a time of day, a day of week, and a location of a user device of the user.

10. The non-transitory computer-readable storage medium of claim 8, wherein selecting a set of trip categories based on parameters comprises:
    determining, for each category, a frequency of the category at the timeframe by determining a percentage of times that the user requested a trip to a destination associated with the category within the timeframe; and
    selecting the one or more trip categories based on the frequency of the most frequently used category.

11. The non-transitory computer-readable storage medium of claim 8, wherein one or more of the generated destinations are selected from destinations of each selected trip category based on the frequency of the trip category at the timeframe.

12. The non-transitory computer-readable storage medium of claim 8, wherein the variety score for a user within a selected trip category is based on a ratio of the number of times that the user has requested a destination the user has never requested before within the selected trip category and within the current timeframe to the number of times the user has requested any destination within the selected category and within the current timeframe.

13. The non-transitory computer-readable storage medium of claim 8, wherein the general population destinations of users within a category include destinations of past trips that are associated with the same category as the current user, and that were requested by users other than the current user.

14. The non-transitory computer-readable storage medium of claim 8, wherein recommending one or more of the determined destinations to the user comprises:
   transmitting one or more of the determined destinations to a user device; and
   presenting one or more of the transmitted destinations to the user such that the user may select a destination without entering an address, the presentation occurring without the user interacting with an application on the user device.

15. A computer system comprising:
   one or more computer processors for executing computer program instructions; and
   a non-transitory computer-readable storage medium storing instructions executable by the one or more computer processors to perform steps comprising:
      determining a set of parameters associated with a user of a user device, the parameters including a timeframe for a trip;
      selecting a set of trip categories, based on prior destinations of the user at a similar timeframe and further based on the determined parameters;
      for each of the selected trip categories:
         determining a variety score associated with the selected trip category for the user based on the determined parameters and based on information about past behavior of the user; and
         generating a set of destinations to recommend to the user for the selected trip category including user-specific destinations the user has visited and general population destinations the user has not visited but that other users have visited, wherein the variety score is used to determine a portion of the set that are user-specific destinations and a portion of the set that are general population destinations; and
      transmitting one or more destinations from each of the generated sets of destinations associated with the selected trip categories to the user device for presentation to the user wherein the presentation includes user-selectable graphical interface components, each component representative of a destination.

16. The computer system of claim 15, wherein the parameters include one or more of a time of day, a day of week, and a location of a user device of the user.

17. The computer system of claim 15, wherein selecting a set of trip categories based on the determined parameters comprises:
   determining, for each category, a frequency of the category at the timeframe by determining a percentage of times that the user requested a trip to a destination associated with the category within the timeframe; and
   selecting the one or more trip categories based on the frequency of the most frequently used category.

18. The computer system of claim 15, wherein one or more of the generated destinations are selected from destinations of each selected trip category based on the frequency of the trip category at the timeframe.

19. The computer system of claim 15, wherein the variety score for a user within a selected trip category is based on a ratio of the number of times that the user has requested a destination the user has never requested before within the selected trip category and within the current timeframe to the number of times the user has requested any destination within the selected category and within the current timeframe.

20. The computer system of claim 15, wherein recommending one or more of the determined destinations to the user comprises:
   transmitting one or more of the determined destinations to a user device; and
   presenting one or more of the transmitted destinations to the user such that the user may select a destination without entering an address, the presentation occurring without the user interacting with an application on the user device.

* * * * *